United States Patent
He et al.

(10) Patent No.: US 12,468,573 B2
(45) Date of Patent: *Nov. 11, 2025

(54) ADAPTIVE RESOURCE PROVISIONING FOR A MULTI-TENANT DISTRIBUTED EVENT DATA STORE

(71) Applicant: Fortinet, Inc., Sunnyvale, CA (US)

(72) Inventors: Jun He, San Jose, CA (US); Partha Bhattacharya, Cupertino, CA (US); Jae Yoo, Morgan Hill, CA (US)

(73) Assignee: Fortinet, Inc., Sunnyvale, CA (US)

( * ) Notice: Subject to any disclaimer, the term of this patent is extended or adjusted under 35 U.S.C. 154(b) by 291 days.

This patent is subject to a terminal disclaimer.

(21) Appl. No.: 18/074,254

(22) Filed: Dec. 2, 2022

(65) Prior Publication Data

US 2023/0124404 A1   Apr. 20, 2023

Related U.S. Application Data

(63) Continuation of application No. 16/815,172, filed on Mar. 11, 2020, now Pat. No. 11,531,570.

(51) Int. Cl.
*G06F 9/50* (2006.01)
*G06F 9/38* (2018.01)
(Continued)

(52) U.S. Cl.
CPC .......... *G06F 9/5027* (2013.01); *G06F 9/3856* (2023.08); *G06F 9/4837* (2013.01);
(Continued)

(58) Field of Classification Search
CPC .... G06F 9/5027; G06F 9/3856; G06F 9/4837; G06F 9/4881; G06F 9/541; G06F 16/182;
(Continued)

(56) References Cited

U.S. PATENT DOCUMENTS 5,311,505 A * 5/1994 Antoine ................ H04J 3/1682
370/538
5,809,539 A * 9/1998 Sakakibara ......... G06F 12/0607
711/158

(Continued)

OTHER PUBLICATIONS

Walters, R, MongoDB, "Time Series Data and MongoDB: Part 1—An Introduction", https://www.mongodb.com/blog/plst/time-series-data-and mongodb-part1-introduction, dwnld Jun. 2020.

(Continued)

*Primary Examiner* — Aimee Li
*Assistant Examiner* — Hsing Chun Lin
(74) *Attorney, Agent, or Firm* — Jaffery Watson Hamilton & DeSanctis LLP (57) ABSTRACT

Systems and methods for adaptively provisioning a distributed event data store of a multi-tenant architecture are provided. According to one embodiment, a managed security service provider (MSSP) maintains a distributed event data store on behalf of each tenant of the MSSP. For each tenant, the MSSP periodically determines a provisioning status for a current active partition of the distributed event data store of the tenant. Further, when the determining indicates an under-provisioning condition exits, the MSSP dynamically increases number of resource provision units (RPUs) to be used for a new partition to be added to the partitions for the tenant by a first adjustment ratio. While, when the determining indicates an over-provisioning condition exists, the MSSP dynamically decreases the number of RPUs to be used for subsequent partitions added to the partitions for the tenant by a second adjustment ratio.

20 Claims, 9 Drawing Sheets

(51) Int. Cl.
   *G06F 9/48* (2006.01)
   *G06F 9/54* (2006.01)
   *G06F 16/182* (2019.01)
   *G06F 16/27* (2019.01)
   *H04L 9/40* (2022.01)

(52) U.S. Cl.
   CPC ............ *G06F 9/4881* (2013.01); *G06F 9/541* (2013.01); *G06F 16/182* (2019.01); *G06F 16/278* (2019.01); *H04L 63/0272* (2013.01)

(58) Field of Classification Search
   CPC .... G06F 16/278; G06F 9/5016; G06F 9/5022; G06F 16/256; G06F 5/065; G06F 9/5061; H04L 63/0272; H04L 63/1416; H04L 47/83; H04L 47/826; H04L 63/20
   See application file for complete search history.

(56) References Cited

U.S. PATENT DOCUMENTS

| | | | | |
|---|---|---|---|---|
| 10,003,606 | B2* | 6/2018 | Roundy | H04L 63/1416 |
| 2018/0121095 | A1* | 5/2018 | Atia | G06F 3/0631 |
| 2021/0326032 | A1* | 10/2021 | Catakli | H04L 41/22 |

OTHER PUBLICATIONS

Elasticsearch, "Rollup overview", HTTPS://www.elastic.org/guide/en/elasticsearch/reference/current/rollup-overview. html downloaded Jun. 28, 2020.
Hammink, John DZone, "An Introduction to Apache Cassandra", Jul. 31, 2019.
Walters, R, MongoDB, "Time Series Data and MongoDB: Part 2—Schema Design Best Practices", https://www.mongodb.com/blog/post/time-series-data-and mongodb-db, downloaded Jun. 2020.

* cited by examiner

ADAPTIVE RESOURCE PROVISIONING FOR A MULTI-TENANT DISTRIBUTED EVENT DATA STORE

CROSS-REFERENCE TO RELATED APPLICATIONS

This application is a continuation of U.S. patent application Ser. No. 16/815,172 filed on Mar. 11, 2020, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright® 2020, Fortinet, Inc.

BACKGROUND

Field

Embodiments of the present invention generally relate to big data storage and multi-tenant architectures. In particular, embodiments of the present invention relate to systems and methods for adaptively provisioning a distributed event data store of a tenant of a multi-tenant architecture for effectively responding to changes in demand for storage of high-volume, time-based events.

Description of the Related Art

In the context of a multi-tenant architecture, one instance of a network resource, such as an application and/or a database, may be used to serve multiple customers or organizations, called tenants. In order to secure confidential data for each tenant against access by other tenants, the multi-tenant architecture typically segregates data for each tenant. Multi-tenant architectures are advantageous for both vendors as well as customers due to cost savings achieved through economies of scale.

In the context of a managed security service provider (MSSP), a multi-tenant architecture may be used to maintain a distributed event data store on behalf of each tenant containing high-volume, time-based events, such as system logs and application logs, network performance metrics, network traffic logs, and the like, which may be used by big data analytics applications.

SUMMARY

Systems and methods are described for adaptively provisioning a distributed event data store of a multi-tenant architecture. According to one embodiment, a distributed event data store is maintained by a managed security service provider (MSSP) on behalf of each tenant of the MSSP. For a given tenant, the distributed event data store includes partitions operable to store event data for computer systems of a private network of the tenant over a predetermined window of time. Each partition includes a number of resource provision units (RPUs), each providing a predefined amount of storage and a predefined processing throughput. For each tenant, the MSSP periodically determines a provisioning status for a current active partition of the distributed event data store of the tenant. When the provisioning status indicates an under-provisioning condition exits, the MSSP dynamically increases the number of RPUs to be used for a new partition to be added to the partitions for the tenant by a first adjustment ratio calculated based on the predetermined window of time and an actual amount of time it took for the current partition to be filled with the event data of the tenant. When the determining indicates an over-provisioning condition exists, the MSSP dynamically decreases the number of RPUs to be used for subsequent partitions added to the partitions for the tenant by a second adjustment ratio calculated based on the predetermined window of time and an amount of time estimated to fill the current partition with the event data of the tenant.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for adaptively provisioning a distributed event data store of a multi-tenant architecture. With tremendous compliance requirements, there arises a need to store almost every log from every tenant over a long period of time. Therefore, the event data stores should be able to handle a high volume of data. However, it is difficult to statically provision resources upfront for a distributed event data store to match the dynamic and highly variable requirements of different tenants. For example, a distributed event data store for a particular tenant may be under-provisioned resulting in the incoming event rate being greater than the throughput and/or capacity provided by the distributed event data store. In contrast, the distributed event data store for the particular tenant may be over-provisioned resulting in the incoming event rate being less than the throughput and/or capacity provided by the distributed event data.

The above scenarios may become more complex when different tenants experience different provisioning situations at the same time, which makes it desirable to have a dynamic approach for provisioning of the distributed event data store. However, existing distributed event data stores (e.g., Elasticsearch, MongoDB, and Apache Cassandra) do not provide dynamic provisioning since it is application specific. Further, manual adjustments for provisioning are tedious and call for expert-level knowledge.

As such embodiments described herein seek to dynamically respond to changes of event storage demand for tenants of a multi-tenant architecture by adaptively provisioning a distributed multi-tenant event data store, including monitoring for and handling under-provisioning and over-provisioning situations.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment." "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways. UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DOS attack detection and mitigation appliances).

As used herein a "distributed event data store" generally refers to a data store that is distributed across multiple machines (e.g., servers) for storing information regarding high-volume, time-based events. Non-limiting examples of a distributed event data store include distributed NoSQL databases (e.g., Elasticsearch, MongoDB, and Apache Cassandra). Non-limiting examples of high-volume, time-based events include events associated with system logs, application logs, network performance metrics and network traffic logs. In the context of embodiments described herein, a distributed event data store of a cloud-based multi-tenant event logging service is expected to handle complexities including both high volume and high variability. In order to meet regulatory and/or compliance requirements each tenant (e.g., an enterprise customer) may need to store almost every log from every system over a long period of time. Meanwhile, the event rate from the monitored systems may be highly variable as systems are spun up and down based on demand. Security attacks can also cause a burst in event rate. Additionally, in a multi-tenant deployment, each tenant adds their own variability.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

According to various aspects of the present disclosure, a managed security service provider (MSSP) maintains a distributed event data store on behalf of each tenant of the MSSP, wherein for a given tenant, the distributed event data store includes partitions operable to store event data for computer systems of a private network of the tenant over a predetermined window of time and each partition includes a number of resource provision units (RPUs), each providing a predefined amount of storage and a predefined processing throughput. For each tenant, the MSSP periodically determines a provisioning status for a current active partition of the distributed event data store of the tenant. Further, when the determining indicates an under-provisioning condition exits, the MSSP dynamically increases the number of RPUs to be used for a new partition to be added to the partitions for the tenant by a first adjustment ratio calculated based on the predetermined window of time and an actual amount of time it took for the current partition to be filled with the event data of the tenant. While, when the determining indicates an over-provisioning condition exists, the MSSP dynamically decreases the number of RPUs to be used for subsequent partitions added to the partitions for the tenant by a second adjustment ratio calculated based on the predetermined window of time and an amount of time estimated to fill the current partition with the event data of the tenant.

Figure 1:
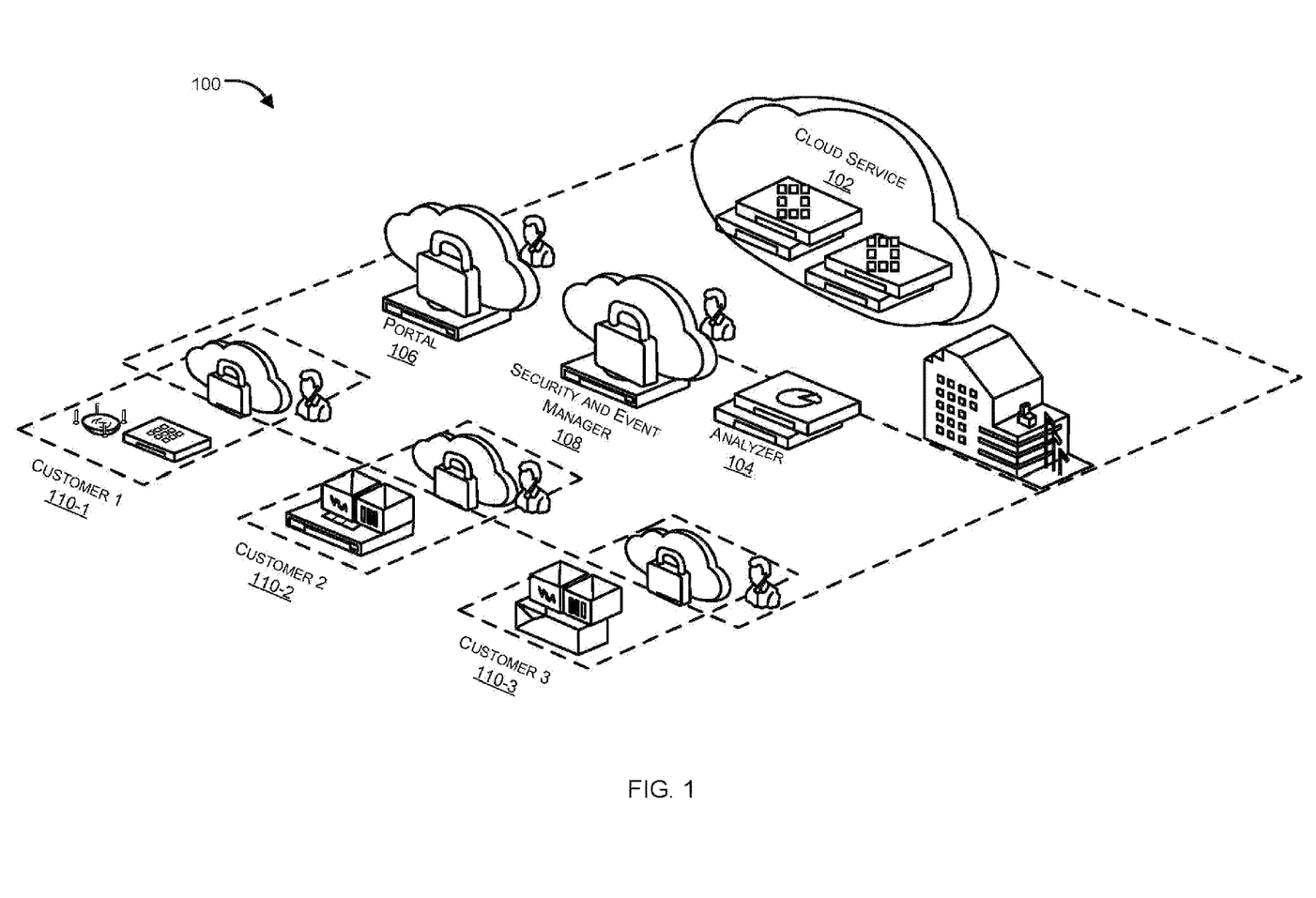
FIG. 1 illustrates a network architecture in which aspects of the present invention can be implemented in accordance with an embodiment of the present invention.

FIG. 1 illustrates a network architecture 100 in which aspects of the present invention can be implemented in accordance with an embodiment of the present invention. According to an embodiment, a security and event manager 108 is associated with an MSSP (not shown), which may manage one or more of the security needs for multiple customers (e.g., customers 110-1, 110-2, and 110-3). Non-limiting examples of the types of services that may be performed by the MSSP include monitoring and management of intrusion detection systems and firewalls, maintaining event logs for information technology (IT) infrastructure, overseeing patch management and upgrades, performing security assessments and security audits, and responding to emergencies. As part of the managed security services provided to the customers, the MSSP may maintain a distributed event data store (not shown) in a cloud service 102.

In one embodiment, the distributed event data store may be distributed across multiple machines (e.g., servers) within the cloud service 102 to facilitate storage of information regarding high-volume, time-based events (e.g., events associated with system logs, application logs, network performance metrics and network traffic logs of networking equipment (e.g., network security appliances) within on-premise networks of the customers and/or within the cloud service 102.

According to one embodiment, security and event manager 108 aids in adaptively provisioning the event data store of a multi-tenant architecture for effectively responding to changes in demand for event storage of a tenant/customer of the multi-tenant architecture.

According to an embodiment, portal 106 provides a centralized management console with remotely managed network security from any location, which enhances security visibility and control of the Internet traffic between enterprise and customers/tenants. Further, analyzer 104 provides centralized network security logging and reporting. An example of a database that may be used to implement the distributed event data store is described below with reference to FIG. 2.

Figure 2:
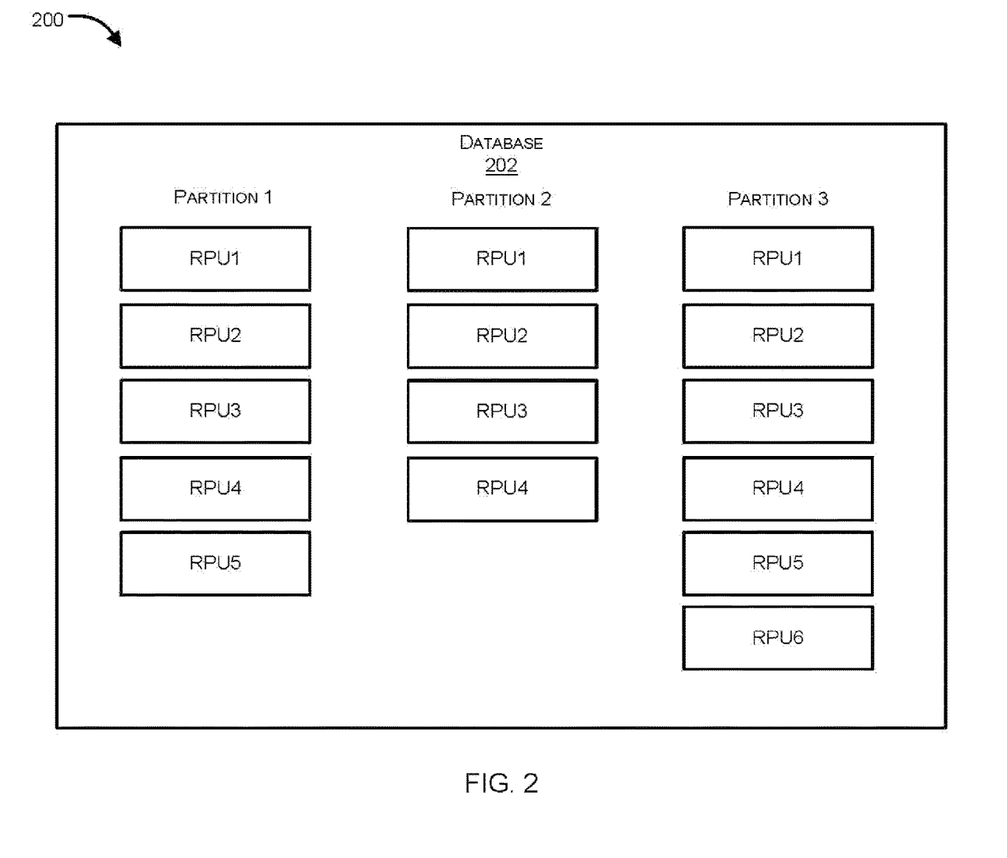
FIG. 2 is a block diagram illustrating components of a database associated with a security and event manager in accordance with an embodiment of the present invention.

FIG. 2 is a block diagram 200 illustrating components of a database 202 associated with a security and event manager in accordance with an embodiment of the present invention. In context of the present example, database 202 represents a distributed event data store of a multi-tenant architecture. Distributed event data stores may be used by big data applications and/or for purposes of meet regulatory and/or compliance requirements of enterprise customers (e.g., customers 110-1, 110-2, and 110-3).

In some embodiments, the database 202 stores high volume, time-based events, such as application logs, performance metrics, network traffic logs, and the like. Those skilled in the art will appreciate that event data grows linearly with time due to the time series nature of the data. Therefore, for purposes of facilitating efficient indexing and querying, the event data may be stored in partitions.

For confidentiality and case of deletion, for example, each partition (e.g. partition 1, partition 2 and partition 3) may store data over a predetermined window of time (e.g., 1 day) for a particular tenant. For example, a first customer/tenant may be associated with partition 1, a second customer/tenant may be associated with partition 2 and a third customer/tenant may be associated with partition 3. While, for sake of brevity, only three partitions are shown in the current example, those skilled in the art will appreciate each customer/tenant will likely make use of many partitions depending upon the window of time represented by the partitions.

In the context of the present example, each partition of database 202 includes a number of RPUs, each of which provides a predefined amount of storage and a predefined processing throughput. Therefore, in this example, each RPU provides event storage as well as processing throughput. For example, each RPU may have a storage size of 50 Gigabytes (GB), which can store event data for a time period of 1 day and the CPU/Memory associated with an RPU may be 1 processor core/40 Megabytes (MB).

In the context of the present example, considering database 202 stores event data over a pre-determined window of one day, the partition of data for a particular customer/tenant might contain a number of RPUs measured by an RPU_count. Existing data store vendors do not provide dynamic provisioning since it is application specific; therefore, making it difficult to react to changes in event storage demand by tenants. However, in embodiments described herein, a Virtualization Data Store Layer (VDSL) is provided so as to enable dynamic provisioning of active data storage for each tenant of a multi-tenant architecture.

Figure 3:
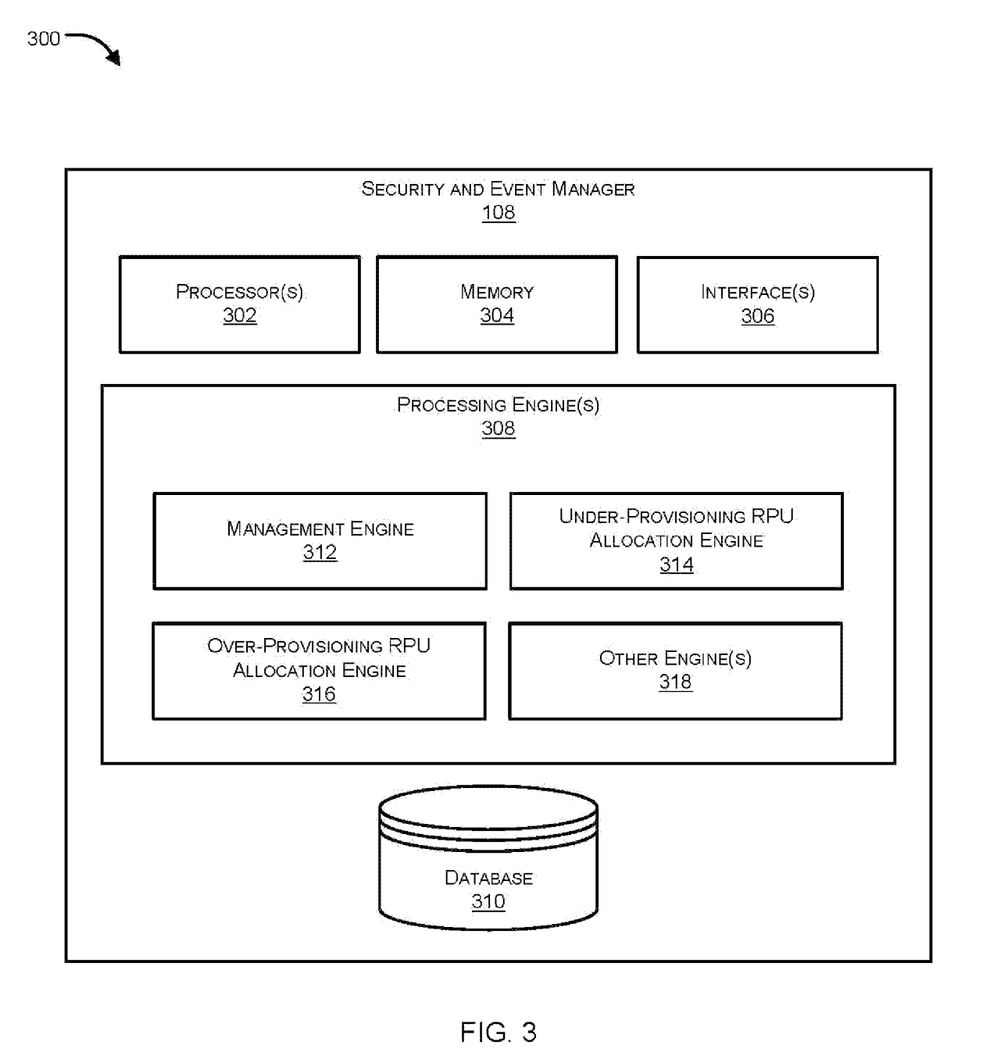
FIG. 3 is a block diagram illustrating functional components of security and event manager in accordance with an embodiment of the present invention.

FIG. 3 is a block diagram 300 illustrating functional components of security and event manager 108 in accordance with an embodiment of the present invention. In the context of the present example, security and event manager 108 can include one or more processor(s) 302. Processor(s) 302 can be implemented as one or more microprocessors, microcomputers, microcontrollers, digital signal processors, central processing units, logic circuitries, and/or any devices that manipulate data based on operational instructions. Among other capabilities, processor(s) 302 are configured to fetch and execute computer-readable instructions stored in a memory 304 of the security and event manager 108. Memory 304 can store one or more computer-readable instructions or routines, which may be fetched and executed to create or share the data units over a network service. Memory 304 can include any non-transitory storage device including, for example, volatile memory such as RAM, or non-volatile memory such as EPROM, flash memory, and the like. In an example embodiment, memory 304 may be a local memory or may be located remotely, such as a server, a file server, a data server, and the Cloud.

Security and event manager 108 can also include one or more Interface(s) 306. Interface(s) 306 may include a variety of interfaces, for example, interfaces for data input and output devices, referred to as I/O devices, storage devices, and the like. Interface(s) 306 may facilitate communication of security and event manager 108 with various devices coupled to security and event manager 108. Interface(s) 306 may also provide a communication pathway for one or more components of security and event manager 108. Examples of such components include, but are not limited to, processing engine(s) 308 and a database 310.

Processing engine(s) 308 can be implemented as a combination of hardware and software or firmware programming (for example, programmable instructions) to implement one or more functionalities of engine(s) 308. In the examples described herein, such combinations of hardware and software or firmware programming may be implemented in several different ways. For example, the programming for the engine(s) 308 may be processor executable instructions stored on a non-transitory machine-readable storage medium and the hardware for engine(s) 308 may include a processing resource (for example, one or more processors), to execute such instructions. In the examples, the machine-readable storage medium may store instructions that, when executed by the processing resource, implement engine(s) 308. In such examples, security and event manager 108 can include the machine-readable storage medium storing the instructions and the processing resource to execute the instructions, or the machine-readable storage medium may be separate but accessible to security and event manager 108 and the processing resource. In other examples, processing engine(s) 308 may be implemented by electronic circuitry. Database 310 can include data that is either stored or generated as a result of functionalities implemented by any of the components of processing engine(s) 308.

In an example, processing engine(s) 308 can include a management engine 312, an under-provisioning RPU allocation engine 314, an over-provisioning RPU allocation engine 316 and other engine(s) 318. Other engine(s) 318 can implement functionalities that supplement applications or functions performed by security and event manager 108 or processing engine(s) 308.

According to an embodiment, management engine 312 can maintain a distributed event data store on behalf of each tenant of the MSSP. For a given tenant of the distributed event data store can include a number of partitions operable to store event data for computer systems of a private network of the given tenant over a predetermined window of time. Further, each partition may include a number of RPUs that each provide a predefined amount of storage and a predefined processing throughput.

For each tenant, the management engine 312 is responsible for periodically determining a provisioning status for a current active partition of the distributed event data store of the tenant by determining the existence of an under-provisioning condition at a first frequency, and determining existence of an over-provisioning condition at a second frequency (lower than the first frequency). For example, management engine 312 can perform hourly or multi-hourly checks for the under-provisioning condition and semi-daily or daily checks for the over-provisioning condition.

Those skilled in the art will appreciate that the under-provisioning condition exits when a current partition is full when it is evaluated (assuming the evaluation is performed at a frequency that results in the evaluation being performed more than once during the predetermined time window). In one embodiment, when the provisioning status evaluation indicates an under-provisioning condition exits, the under-provisioning RPU allocation engine 314 dynamically increases the number of RPUs to be used for a new partition to be added to the partitions for the tenant by a first adjustment ratio. The first adjustment ratio may be calculated based on the predetermined window of time and an actual amount of time it took for the current partition to be filled with event data from the tenant. Specifically, the first adjustment ratio may be the predetermined window of time divided by the amount of time estimated to fill the current partition. The number of RPUs to be used for the new partition may then be represented by a maximum of (i) an ideal RPU count times the first adjustment ratio and (ii) 1, where the ideal RPU count is a size of the current partition divided by the predefined amount of storage provided by each RPU of the current partition.

To provide clarity, in the context of the current example, if the current active partition for a tenant is full, the under-provisioning RPU allocation engine 314 may adjust the number of RPUs (RPU_count) to be used for a new partition for the tenant. For example, the revised number of RPUs (the new RPU_count) to be used for the new partition can be determined by:

$$RPU\_count = \max(c*r, 1) \qquad \text{EQ \#1}$$

where,
c is the ideal RPU_count; and
r is the first adjustment ratio.

In the context of the present example, c can be calculated by $$c = Partition\_size / RPU\_size \qquad \text{EQ \#2}$$

where,
Partition_size is the size of the current partition; and
RPU_size is the predefined amount of storage provided by each RPU of the current partition.

In context of the present example, when the predetermined window of time over which the partition stores event data is 1 day or 24 hours, r can be calculated by:

$$r = 24 / AFT \qquad \text{EQ \#3}$$

where, AFT is the actual fill time to fill the current partition.

Those skilled in the art will appreciate that the over-provisioning condition exists when the amount of time estimated to fill the current partition is greater than X times the predetermined window of time, an age of the current partition is greater than the predetermined window of time, and the number of RPUs of the current partition is greater than 1. In one embodiment, when the when the previsioning status evaluation indicates an over-provisioning condition exists, the over-provisioning RPU allocation engine 316 dynamically decreases the number of RPUs to be used for subsequent partitions added to the partitions for the tenant by a second adjustment ratio calculated based on the predetermined window of time and an amount of time estimated to fill the current partition with event data for the tenant. Specifically, the second adjustment ratio may be the predetermined window of time divided by the amount of time estimated to fill the current partition. The number of RPUs to be used for subsequent partitions may then be represented by a maximum of (i) the number of RPUs of the current partition times the second adjustment ratio and (ii) 1.

To provide clarity, the over-provisioning condition may be determined to exist when demand for event data storage reduces sharply and remains low for a period of time. For example, assuming a daily check for over-provisioning is performed prior to closing of the existing partition for a tenant, over-provisioning RPU allocation engine 316 may reduce the current active RPUs with a new partition of appropriate RU_count to reduce resource usage.

In context of the present example, when predetermined window of time over which the partition stores event data is of 1 day or 24 hours, the over-provisioning condition exits when:

(i) EFT>X*24;
where, EFT is an estimated fill time to fill the current partition; and
X=2
(ii) Partition_Age>24; and
where,
Partition_Age is the age of the current partition; and
(iii) RPU_count>1
where,
RPU_count is the number of RPUs in the current partition.

If (i), (ii) and (iii) are true, then the over-provisioning RPU allocation engine 316 can adjust the RPU_count for the new partition for the tenant, using:

$$RPU\_count = \max(RPU\_count * r', 1) \qquad \text{EQ \#4}$$

where,
r' is the second adjustment ratio

In the context of the present example, r' is the adjustment ratio for use in connection with calculating a new partition to hold event data for one day, which can be calculated as:

$$r' = 24 / EFT \qquad \text{EQ \#5}$$

where, EFT is the estimated fill time to fill the current partition with event data for the tenant Those skilled in the art will appreciate that the complexity of provisioning and de-provisioning performed can be hidden from applications by using an abstraction layer, e.g., a Virtual Data Store (VDS) representation, which provides transparent interfaces to applications for writing to and reading from partitions. In one embodiment, a naming convention can be used by the VDS to identify partitions for a particular tenant and/or associated with a particular date. For example, the VDS can represent partition names by including a tenant name or tenant identifier and the date (e.g., partition_<tenant>_<date>). Similarly, the event store may represent partition names by appending a sequence number (e.g., partition_<tenant>_<date>_<seq_no>). In this manner, by convention, the currently active partition being written to by the VDS for a particular tenant is the one associated with the current date and having the highest sequence number.

Figure 4:
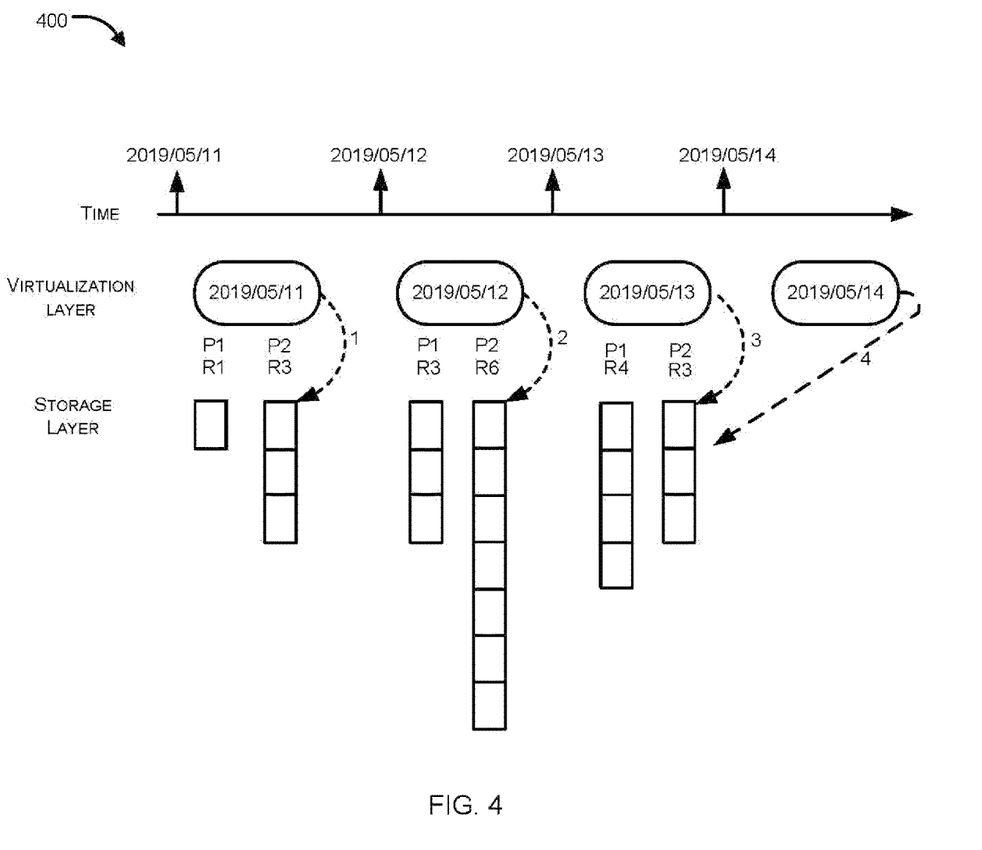
FIG. 4 illustrates an exemplary timeline of change of events in storage and virtualization layers in accordance with an embodiment of the present invention.

FIG. 4 illustrates an exemplary timeline 400 of change of events in storage and virtualization layers in accordance with an embodiment of the present invention. The present example illustrates how RPUs in partitions of a tenant may be increased or decreased in accordance with changing event storage needs. In the context of the present example, relating to partitions associated with a single tenant, during storage of event data on May 11, 2019, the RPU_count was increased (as a result of detecting an under-provisioning condition) from an initial allocation of 1 RPU (R1) associated with partition 1 (P1) to 3 RPUs (R3) being associated with partition 2 (P2). Similarly, on May 12, 2019, the initial allocation of 3 RPUs (R3) for partition 1 (P1) was increased to 6 (R6) for partition 2 (P2). However, by the end of May 12, 2019, the rate of event data storage slowed, thereby triggering an over-provisioning condition and corresponding reduction in the RPU_count from 6 to 4 (R4) for partition 1 on May 13, 2019. Similarly, a continued decrease in event data storage on May 13, 2019, has left some of the RPUs of P2 unused, thereby allowing the remaining RPUs of P2 to be used on May 14, 2019.

Figure 5:
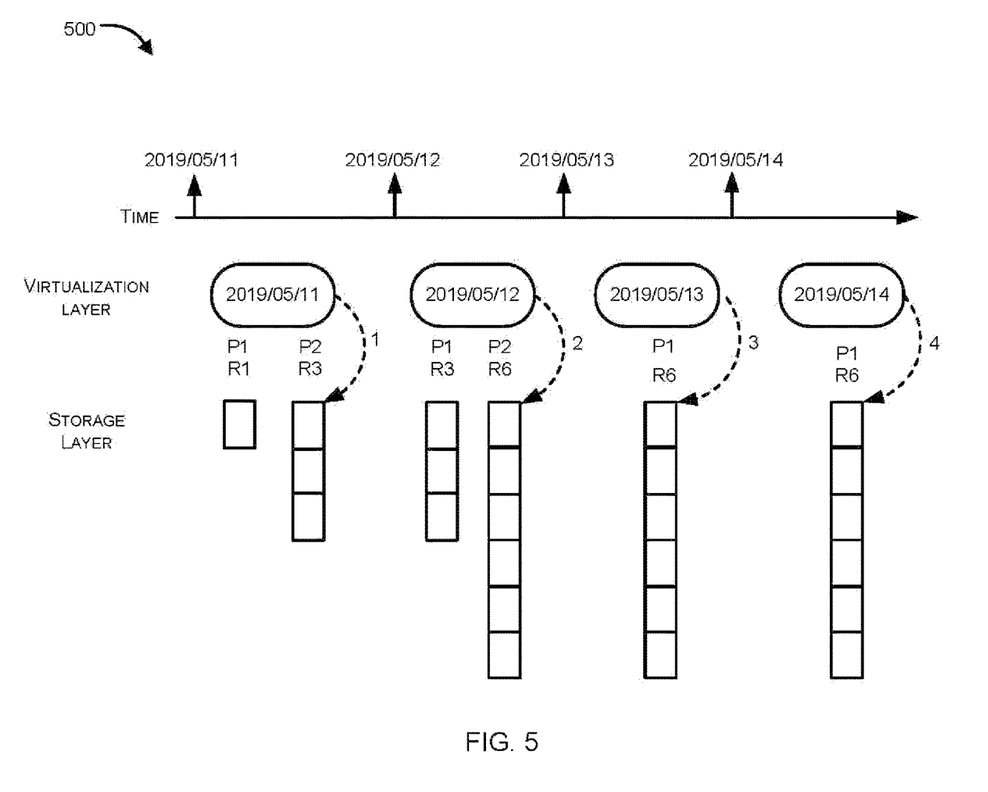
FIG. 5 illustrates an exemplary timeline of change of events in storage and virtualization layers in an under-provisioning scenario in accordance with an embodiment of the present invention.

FIG. 5 illustrates exemplary timeline 500 of change of events in storage and virtualization layers in an under-provisioning scenario in accordance with an embodiment of the present invention. In the context of the present example, on May 11, 2019, the RPU_count for the tenant is initially 1 (R1) for partition 1 (P1), but as a result of an under-provisioning condition has been increased to 3 for partition 2 (P2). Similarly, on May 12, 2019, the RPU_count is initially 3 (R3) for partition 1 (P1), but due to an increased rate of event storage during the day, the RPU_count has been increased to 6 (R6) for partition 2 (P2). Finally, for May 13, 2019 and May 14, 2019, due to a consistent rate of event storage, the RPU_count of 6 (R6) remains for partition 1 (P1) on May 13, 2019 and for partition 1 (P1) on May 14, 2019.

Figure 6:
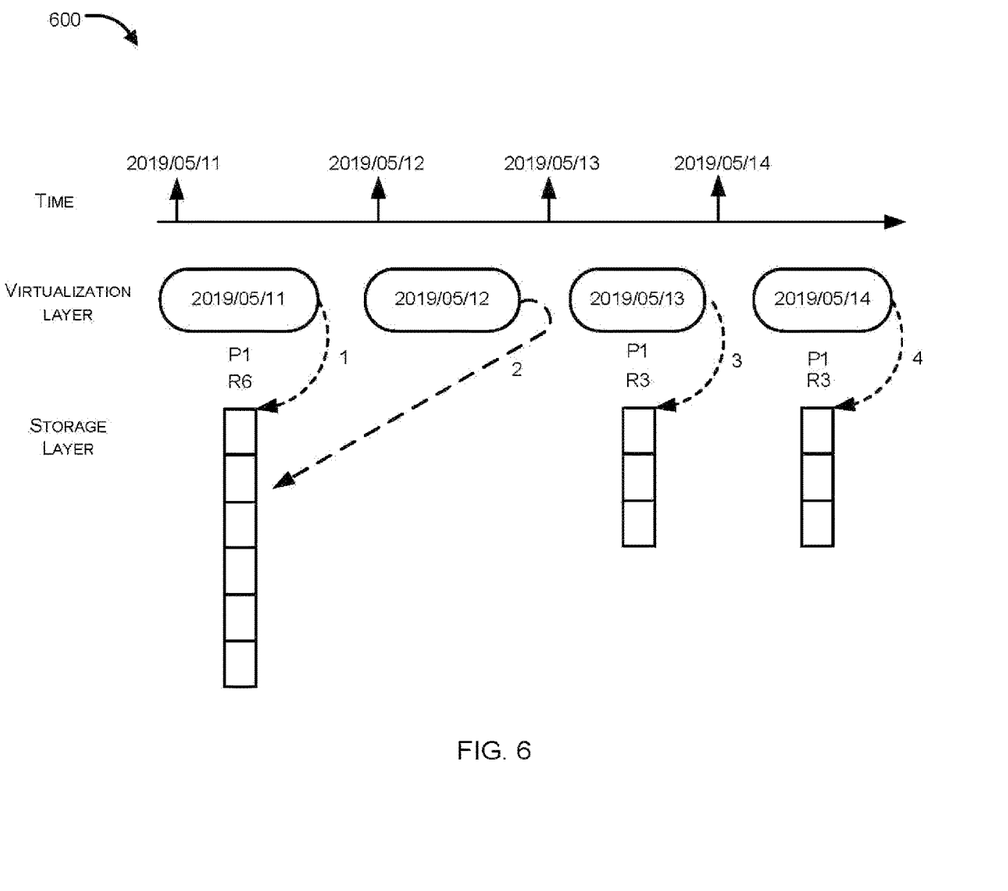
FIG. 6 illustrates an exemplary timeline of change of events in storage and virtualization layers in an over-provisioning scenario in accordance with an embodiment of the present invention.

FIG. 6 illustrates exemplary timeline 600 of change of events in storage and virtualization layers in an over-provisioning scenario in accordance with an embodiment of the present invention. In the context of the present example, on May 11, 2019, the RPU_count for the tenant is initially 6 (R6) for partition 1 (P1), but as a result of an over-provisioning condition, not all of the RPUs of P1 were used on May 11, 2019. As such, the remaining RPUs of P1 continue to be used on May 12, 2019 and the RPU_count has been decreased to 3 (R3) for creation of new partitions. As such, when partition 1 (P1) is created on May 13, 2019, it includes 3 (R3) RPUs. Finally, on May 14, 2019, due to a consistent rate of event storage, the RPU_count of 3 (R3) remains and the new partition 1 (P1) created for storing event data for May 14, 2019 includes 3 (R3) RPUs.

For purposes of further illustrating the operation of EQs #1-5 assuming a predetermined window of 24 hours, some examples of a new RPU_count determined based on a current RPU_count and the AFT are provided below in Table 1.

TABLE 1

| RPU_Count (current) | Actual Fill Time (AFT) or Estimated Fill Time (EFT) | RPU_Count (new) |
| --- | --- | --- |
| 5 | 24 hours | 5 |
| 5 | 12 hours | 10 |
| 5 | 6 hours | 20 |
| 5 | 1 hours | 120 |

TABLE 1-continued

| RPU_Count (current) | Actual Fill Time (AFT) or Estimated Fill Time (EFT) | RPU_Count (new) |
| --- | --- | --- |
| 5 | 2 days | 2 |
| 5 | 5 days | 1 |
| 5 | 7 days | 1 |

For sake of brevity, two rows of Table 1 are explained. In row 2, the RPU_count was initially 5 and all RPUs were actually filled in 12 hours (i.e., AFT=12). As such, an under-provisioning condition exists and in accordance with EQs #1-3, the first adjustment ratio (r) is 2, thereby doubling the new RPU_count for subsequently created new partitions to 10 (subject to the next evaluation cycle). In row, 6, the RPU_count was initially 5 and at the current rate of event data storage it is estimated it will take 5 days to fill all 5 RPUs (i.e., EFT=120). As such, an over-provisioning condition exists and in accordance with EQs #4-5, the second adjustment ratio (r') is. 2, thereby reducing the new RPU_Count by 80% to a new RPU_count of 1 for subsequently created new partitions (subject to the next evaluation cycle).

Figure 7A:
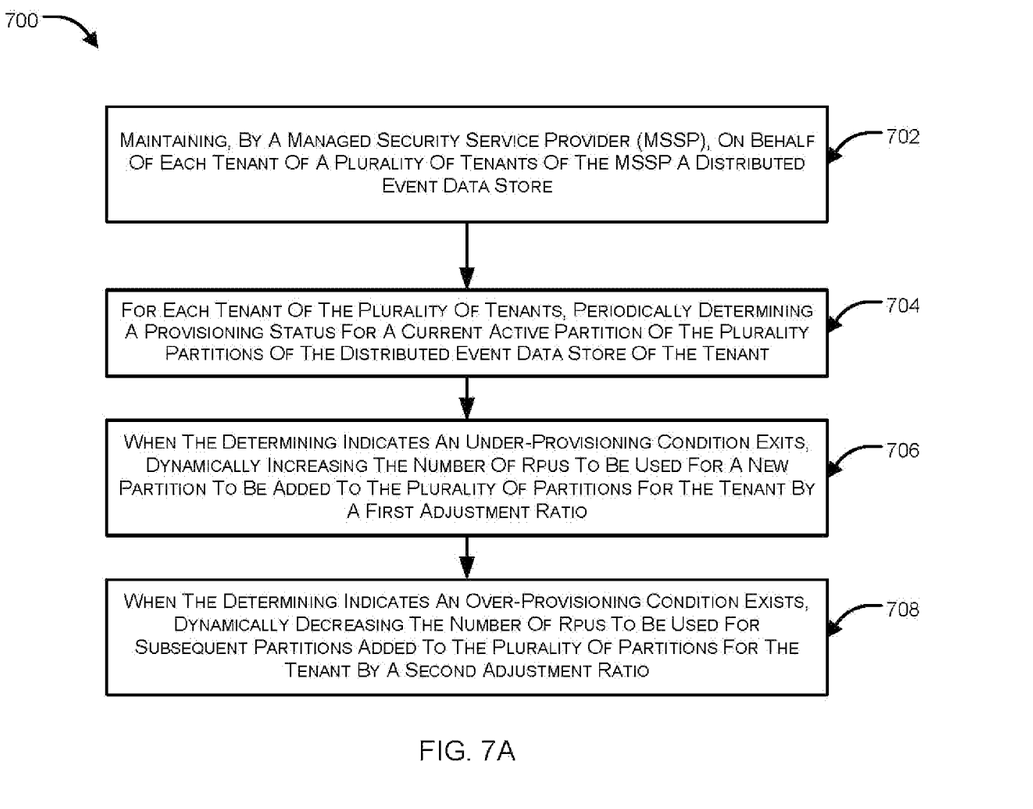
FIG. 7A is a flow diagram illustrating an over-all process performed by a security and event manager in accordance with an embodiment of the present invention.
Figure 7B:
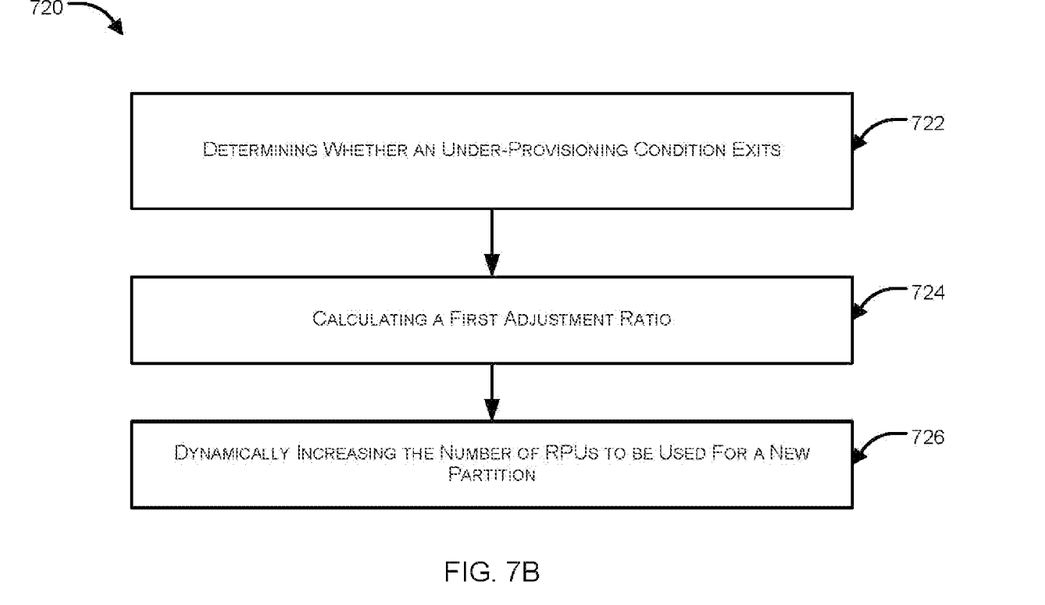
FIG. 7B is a flow diagram illustrating a process performed by a security and event manager in under-provisioning scenario in accordance with an embodiment of the present invention.
Figure 7C:
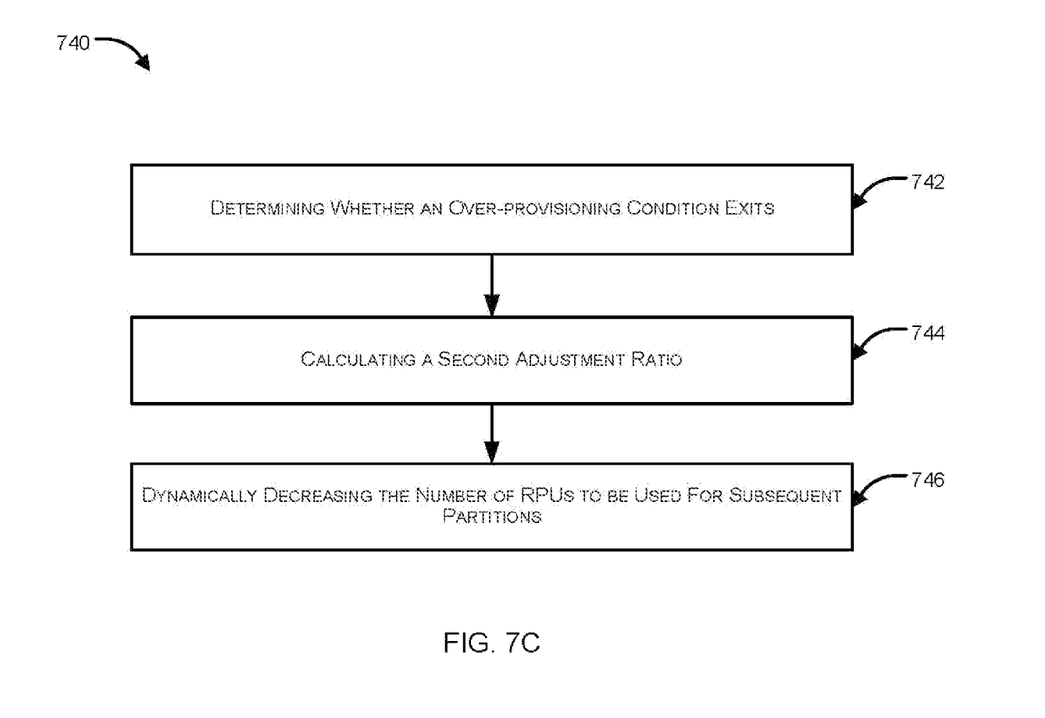
FIG. 7C is a flow diagram illustrating a process performed by a security and event manager in over-provisioning scenario in accordance with an embodiment of the present invention.

FIGS. 7A-C are flow diagrams 700, 720 and 740 illustrating processes performed by a security and event manager (e.g., security and event manager 108) in accordance with various embodiments of the present invention. The processing described with reference to FIGS. 7A-C may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 800 described with reference to FIG. 8 below.

FIG. 7A is a flow diagram 700 illustrating an over-all process performed by a security and event manager in accordance with an embodiment of the present invention. In the context of the present example, at block 702, a security and event manager of an MSSP maintains a distributed event data store on behalf of each tenant of a various tenants of the MSSP. For a given tenant, the distributed event data store includes a various partitions operable to store event data for computer systems of a private network of the given tenant over a predetermined window of time. Further, each partition includes a number of RPUs such that each RPU provides a predefined amount of storage and a predefined processing throughput. At block 704, the security and event manager periodically determines a provisioning status for a current active partition of the partitions of the distributed event data store of each tenant. When the determining indicates an under-provisioning condition exits, at block 706, the security and event manager dynamically increases the number of RPUs to be used for a new partition to be added to the partitions for the tenant by a first adjustment ratio calculated based on the predetermined window of time and an actual amount of time it took for the current partition to be filled with the event data of the tenant. Conversely, when the determining indicates an over-provisioning condition exists, at block 708, the security and event manager dynamically decreases the number of RPUs to be used for subsequent partitions added to the partitions for the tenant by a second adjustment ratio calculated based on the predetermined window of time and an amount of time estimated to fill the current partition with the event data of the tenant.

FIG. 7B is a flow diagram 720 illustrating a process performed by a security and event manager in under-provisioning scenario in accordance with an embodiment of the present invention. In the context of the present example, at block 722, the security and event manager determines an under-provisioning condition exits when a current active partition of the distributed event data store of a tenant of a multi-tenant architecture is full when it is checked. When the determining indicates that the under-provisioning condition exits at block 724, the security and event manager, calculates a first adjustment ratio based on a predetermined window of time and an actual amount of time it took for the current partition to be filled with event data of the tenant. Further, at block 726, the security and event manager, dynamically increases the number of RPUs to be used for a new partition to be added to the partitions for the tenant by the first adjustment ratio.

Based on the foregoing example, those skilled in the art will appreciate, when an under-provisioning condition is determined to exist, the RPU count will be increased and the adjustment is demand driven and time-based.

FIG. 7C is a flow diagram 740 illustrating a process performed by a security and event manager in over-provisioning scenario in accordance with an embodiment of the present invention. In context of the present example, at block 724, the security and event manager determines whether an over-provisioning condition exits when an estimated fill time (EFT) to fill a current active partition of the distributed event data store of a tenant of a multi-tenant architecture is greater than X times predetermined window of time, an age of the current partition is greater than the predetermined window of time, and the number of RPUs of the current partition is greater than 1. When the determining indicates an over-provisioning condition exists, at block 744, the security and event manager calculates a second adjustment ratio based on the predetermined window of time and an amount of time estimated to fill the current partition with the event data of the tenant. Further, at block 746, the security and event manager dynamically decreases the number of RPUs to be used for subsequent partitions added to the partitions for the tenant by the second adjustment ratio.

Based on the foregoing example, those skilled in the art will appreciate, when an over-provisioning condition is determined to exist, the RPU count will be decreased (to a minimum of 1 RPU) and the adjustment is demand driven and time-based.

Figure 8:
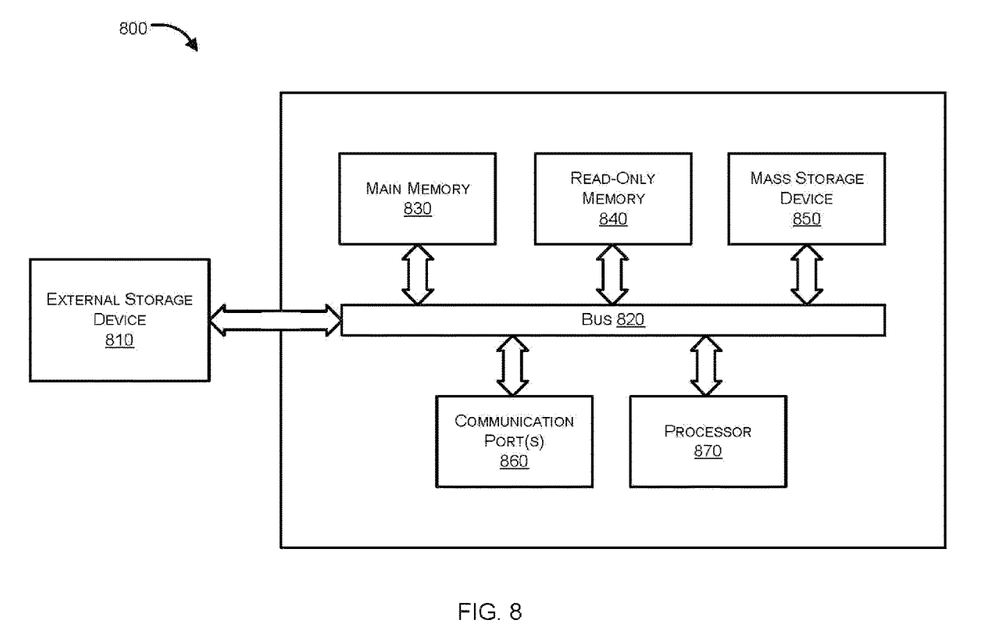
FIG. 8 illustrates an exemplary computer system in which or with which embodiments of the present invention may be utilized.

FIG. 8 illustrates an exemplary computer system 800 in which or with which embodiments of the present invention may be utilized. As shown in FIG. 8, computer system includes an external storage device 810, a bus 820, a main memory 830, a read only memory 840, a mass storage device 850, a communication port 860, and a processor 870. In one embodiment, computer system 800 may represent some portion of a security and event manager (e.g., security and event manager 108).

Those skilled in the art will appreciate that computer system 800 may include more than one processor 870 and communication ports 860. Examples of processor 870 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A non-transitory computer-readable storage medium embodying a set of instructions, which when executed by one or more processing resources, causes the one or more processing resources to:

maintain on behalf of each tenant of a plurality of tenants of a managed security service provider (MSSP), a distributed event data store, wherein for a given tenant of the plurality of tenants, the distributed event data store includes a plurality of partitions operable to store event data for a plurality of computer systems of a private network of the given tenant over a predetermined window of time, wherein each partition of the plurality of partitions includes a number of resource provision units (RPUs), each RPU providing a predefined amount of storage and a predefined processing throughput;

for the given tenant of the plurality of tenants, periodically determine a provisioning status prior to closing a current partition of the plurality of partitions of the distributed event data store of the given tenant;

when the provisioning status indicates an over-provisioning condition exists for the current partition, dynamically decreasing, with the one or more processing resources, a number of RPUs to be used for a new partition to be later added to the plurality of partitions for the given tenant by an adjustment ratio, wherein the adjustment ratio is based on the predetermined window of time for the current partition divided by an estimated amount of time to fill the current partition with the event data of the given tenant, wherein the number of RPUs for the new partition is less than a number of RPUs for the current partition; and store the event data of the given tenant in the new partition.

2. The non-transitory computer-readable storage medium of claim 1, wherein said periodically determining the provisioning status for the current partition of the plurality of partitions of the distributed event data store of the given tenant comprises:

periodically determining existence of the over-provisioning condition at a first frequency; and periodically determining existence of an under-provisioning condition at a second frequency.

3. The non-transitory computer-readable storage medium of claim 1, wherein the over-provisioning condition exists when:

the amount of time estimated to fill the current partition is greater than X times the predetermined window of time, wherein X is greater than 1;

an age of the current partition is greater than the predetermined window of time; and the number of RPUs of the current partition is greater than 1.

4. The non-transitory computer-readable storage medium of claim 1, wherein the number of RPUs to be used for the new partition is a maximum of (i) an ideal RPU count times the adjustment ratio and (ii) 1.

5. The non-transitory computer-readable storage medium of claim 1, wherein the adjustment ratio is a first adjustment ratio, the set of instructions, which when executed by the one or more processing resources, causes the one or more processing resources to:

when the periodically determining indicates an under-provisioning condition exists, dynamically increasing a number of RPUs to be used for another new partition to be added to the plurality of partitions for the given tenant by a second adjustment ratio calculated based on the predetermined window of time and an actual amount of time for the current partition to be filled with the event data of the given tenant.

6. A computer implemented method of dynamically provisioning a distributed multi-tenant event data store, the method comprising:

maintaining, by a managed security service provider (MSSP), on behalf of each tenant of a plurality of tenants of the MSSP a distributed event data store, wherein for a given tenant of the plurality of tenants, the distributed event data store includes a plurality of partitions operable to store event data for a plurality of computer systems of a private network of the given tenant over a predetermined window of time, wherein each partition of the plurality of partitions includes a number of resource provision units (RPUs), each RPU providing a predefined amount of storage and a predefined processing throughput;

for the given tenant of the plurality of tenants, periodically determining a provisioning status prior to closing a current partition of the plurality of partitions of the distributed event data store of the given tenant;

when the provisioning status indicates an over-provisioning condition exists for the current partition, dynamically decreasing, with one or more processing resources, a number of RPUs to be used for a new partition to be later added to the plurality of partitions for the given tenant by an adjustment ratio, wherein the adjustment ratio is based on the predetermined window of time for the current partition divided by an estimated amount of time to fill the current partition with the event data of the given tenant, wherein the number of RPUs for the new partition is less than a number of RPUs for the current partition; and store the event data of the given tenant in the new partition.

7. The method of claim 6, wherein said periodically determining the provisioning status for the current partition of the plurality of partitions of the distributed event data store of the given tenant comprises:

periodically determining existence of the over-provisioning condition at a first frequency; and periodically determining existence of an under-provisioning condition at a second frequency.

8. The method of claim 6, wherein the over-provisioning condition exists when:

the amount of time estimated to fill the current partition is greater than X times the predetermined window of time, wherein X is greater than 1; and an age of the current partition is greater than the predetermined window of time; and the number of RPUs of the current partition is greater than 1.

9. The method of claim 6, wherein the number of RPUs to be used for the new partition is a maximum of (i) an ideal RPU count times the adjustment ratio and (ii) 1.

10. The method of claim 6, wherein the adjustment ratio is a first adjustment ratio, the method further comprising:

when the periodically determining indicates an under-provisioning condition exists, dynamically increasing a number of RPUs to be used for another new partition to be added to the plurality of partitions for the given tenant by a second adjustment ratio calculated based on the predetermined window of time and an actual amount of time for the current partition to be filled with the event data of the given tenant.

11. The method of claim 10, wherein the under-provisioning condition exists when the current partition is full.

12. The method of claim 11, wherein the second adjustment ratio is the predetermined window of time divided by the actual amount of time for the current partition to be filled with the event data of the given tenant.

13. The method of claim 12, wherein the number of RPUs to be used for the another new partition is a maximum of (i) an ideal RPU count times the first second adjustment ratio and (ii) 1.

14. The method of claim 13, wherein the ideal RPU count comprises a size of the current partition divided by the predefined amount of storage provided by each RPU of the plurality of RPUs of the current partition.

15. A system comprising:

one or more processing resources; and a non-transitory computer-readable medium, coupled to the one or more processing resources, having stored therein instructions that when executed by the one or more processing resources cause the one or more processing resources to:

maintain on behalf of each tenant of a plurality of tenants of a MSSP a distributed event data store, wherein for a given tenant of the plurality of tenants, the distributed event data store includes a plurality of partitions operable to store event data for a plurality of computer systems of a private network of the given tenant over a predetermined window of time, wherein each partition of the plurality of partitions includes a number of resource provision units (RPUs), each RPU providing a predefined amount of storage and a predefined processing throughput;

for the given tenant of the plurality of tenants, periodically determining a provisioning status prior to closing a current partition of the plurality of partitions of the distributed event data store of the given tenant;

when the provisioning status indicates an over-provisioning condition exists for the current partition, dynamically decreasing, with one or more processing resources, a number of RPUs to be used for a new partition to be later added to the plurality of partitions for the given tenant by an adjustment ratio, wherein the adjustment ratio is based on the predetermined window of time for the current partition divided by an estimated amount of time to fill the current partition with the event data of the given tenant, wherein the number of RPUs for the new partition is less than a number of RPUs for the current partition; and store the event data of the given tenant in the new partition.

16. The system of claim 15, wherein said periodically determining the provisioning status for the current partition of the plurality of partitions of the distributed event data store of the given tenant comprises:

periodically determine existence of the over-provisioning condition at a first frequency; and periodically determine existence of an under-provisioning condition at a second frequency.

17. The system of claim 15, wherein the over-provisioning condition exists when:

the amount of time estimated to fill the current partition is greater than X times the predetermined window of time, wherein X is greater than 1;

an age of the current partition is greater than the predetermined window of time; and the number of RPUs of the current partition is greater than 1.

18. The system of claim 15, wherein the number of RPUs to be used for the new partition is a maximum of (i) an ideal RPU count times the adjustment ratio and (ii) 1.

19. The system of claim 15, wherein the adjustment ratio is a first adjustment ratio, wherein the instructions when executed by the one or more processing resources cause the one or more processing resources to:

when the periodically determining indicates an under-provisioning condition exists, dynamically increasing the number of RPUs to be used for another new partition to be added to the plurality of partitions for the given tenant by a second adjustment ratio calculated based on the predetermined window of time and an actual amount of time for the current partition to be filled with the event data of the given tenant.

20. The system of claim 19, wherein the under-provisioning condition exists when the current partition is full.

* * * * *